(12) United States Patent
Lee et al.

(10) Patent No.: US 12,548,777 B2
(45) Date of Patent: Feb. 10, 2026

(54) NEGATIVE ELECTRODE FOR SECONDARY BATTERY AND MANUFACTURING METHOD THEREOF

(71) Applicant: SK On Co., Ltd., Seoul (KR)

(72) Inventors: Dong Hoon Lee, Daejeon (KR); Ju Hyun Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/393,858

(22) Filed: Dec. 22, 2023

(65) Prior Publication Data

US 2024/0213478 A1    Jun. 27, 2024

(30) Foreign Application Priority Data

Dec. 26, 2022    (KR) .................. 10-2022-0184766

(51) Int. Cl.
| | |
|---|---|
| *H01M 4/62* | (2006.01) |
| *H01M 4/04* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01M 4/38* | (2006.01) |
| *H01M 4/587* | (2010.01) |
| *H01M 4/02* | (2006.01) |

(52) U.S. Cl.
CPC ......... *H01M 4/622* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/587* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2008/0060189 A1* | 3/2008 | Daidoji | H01M 50/566 29/623.1 |
| 2014/0045077 A1* | 2/2014 | Minami | H01M 10/0567 429/338 |
| 2020/0067071 A1* | 2/2020 | Ahn | H01M 4/131 |

FOREIGN PATENT DOCUMENTS

| | | |
|---|---|---|
| KR | 1020140070259 A | 6/2014 |
| KR | 1020160040830 A | 4/2016 |
| KR | 1020180014520 A | 2/2018 |
| KR | 1020190053130 A | 5/2019 |
| KR | 1020200140482 A | 12/2020 |
| KR | 1020220009279 A | 1/2022 |
| KR | 1020220114249 A | 8/2022 |
| KR | 1020220127636 A | 9/2022 |
| WO | 2021195999 A1 | 10/2021 |

\* cited by examiner

*Primary Examiner* — Zhongqing Wei

(74) *Attorney, Agent, or Firm* — The Webb Law Firm

(57) ABSTRACT

An anode for secondary battery including an anode current collector; a first layer including a binder and contacting at least one cross-section of the anode current collector in a thickness direction; and a second layer including an anode active material and contacting one cross-section of the first layer in a thickness direction. An end portion of the first layer in a width direction perpendicular to the thickness direction protrudes more than an end portion of the second layer in a width direction.

19 Claims, 3 Drawing Sheets

NEGATIVE ELECTRODE FOR SECONDARY BATTERY AND MANUFACTURING METHOD THEREOF

CROSS-REFERENCE TO RELATED APPLICATION

This application claims priority to Korean Patent Application No. 10-2022-0184766 filed Dec. 26, 2022, the disclosure of which is hereby incorporated by reference in its entirety.

BACKGROUND OF THE INVENTION

1. Field of the Invention

The present disclosure relates to a negative electrode for secondary battery and a manufacturing method thereof.

2. Description of Related Art

As the electronics, communications, and space industries develop, demand for lithium secondary battery as an energy power source is drastically increasing. In particular, as the importance of global eco-friendly policies is emphasized, the electric vehicle market is growing swiftly, and research and development on lithium secondary battery is being actively conducted worldwide.

A lithium secondary battery comprises a cathode, an anode, and a separator disposed therebetween, and a cathode and an anode are each provided with an active material which lithium ions may be inserted to and extracted from.

With respect to an anode of lithium secondary battery, the content of a binder included therein may be controlled to improve rapid charging performance while preventing extraction. However, when the distribution of the binder is not precisely controlled, various defects may be caused, so more precise control of the binder distribution is required.

SUMMARY OF THE INVENTION

Embodiments of the present disclosure provide an anode for secondary battery, which can improve rapid charging performance and at the same time improve extraction defects of an anode active material, and a method for manufacturing the same.

An anode for secondary battery according to an embodiment of the present disclosure comprises an anode current collector; a first layer comprising a binder and contacting at least one cross-section of the anode current collector in a thickness direction; and a second layer comprising an anode active material and contacting one cross-section of the first layer in a thickness direction, wherein an end portion of the first layer in a width direction perpendicular to the thickness direction may protrude more than an end portion of the second layer in a width direction.

An anode manufacturing method according to an embodiment of the present disclosure comprises the steps of: applying a first composition comprising a first binder to one cross-section of an anode current collector in a thickness direction; and applying a second composition comprising an anode active material to the applied first composition, wherein the second composition may be applied such that an end portion in a width direction perpendicular to the thickness direction may be located more internally than the position where the first composition is applied.

According to an embodiment of the present disclosure, an anode for secondary battery, which can improve rapid charging performance and at the same time improve extraction defects of an anode active material, and a method for manufacturing the same may be provided.

DESCRIPTION OF THE INVENTION

Structural or functional descriptions of embodiments disclosed in the present specification or application are merely illustrated for the purpose of describing embodiments according to the technical principle of the present disclosure. In addition, embodiments according to the technical principle of the present disclosure may be implemented in various forms other than the embodiments disclosed in the present specification or application. In addition, the technical principle of the present disclosure is not to be construed as being limited to the embodiments described in this specification or application.

Hereinafter, an anode for secondary battery and a manufacturing method thereof according to the present application are described.

<Anode>

An anode for secondary battery according to an embodiment of the present disclosure comprises an anode current collector; a first layer comprising a binder and contacting at least one cross-section of the anode current collector in a thickness direction; and a second layer comprising an anode active material and contacting one cross-section of the first layer in a thickness direction, wherein an end portion of the first layer in a width direction perpendicular to the thickness direction may protrude more than an end portion of the second layer in a width direction.

An anode 1000 for secondary battery according to an embodiment of the present disclosure may comprise an anode current collector 100, a first layer 210, and a second layer 220. The structure of an anode 1000 according to an embodiment of the present invention may be understood with reference to FIG. 1.

An anode current collector 100 is not particularly limited as long as it has conductivity without causing a chemical change in secondary battery. For example, copper, stainless steel, aluminum, nickel, titanium, fired carbon, a copper or stainless steel surface treated with carbon, nickel, titanium, silver, or the like, an aluminum-cadmium alloy, or the like may be used. In addition, fine irregularities may be formed on the surface to enhance the bonding strength of an anode active material, and an anode current collector may be used in various forms such as films, sheets, foils, nets, porous materials, foams, and nonwoven fabrics.

The first layer 210 may comprise a binder. As a binder, a binder having good adhesion to an anode current collector may preferably be used, for example, at least one selected from the group consisting of polyvinylidene fluoride, carboxymethylcellulose, styrene butadiene rubber, polyimide, polyamideimide, polyvinyl alcohol, and hydroxypropylcellulose, polyvinylchloride, carboxylated polyvinylchloride, polyvinyl fluoride, polymers containing ethylene oxide, polyvinylpyrrolidone, polyurethane, polytetrafluoroethylene, polyethylene, polypropylene, acrylated styrene-butadiene rubber, and epoxy resin may be used. Preferably, styrene butadiene rubber may be used.

Figure 1:
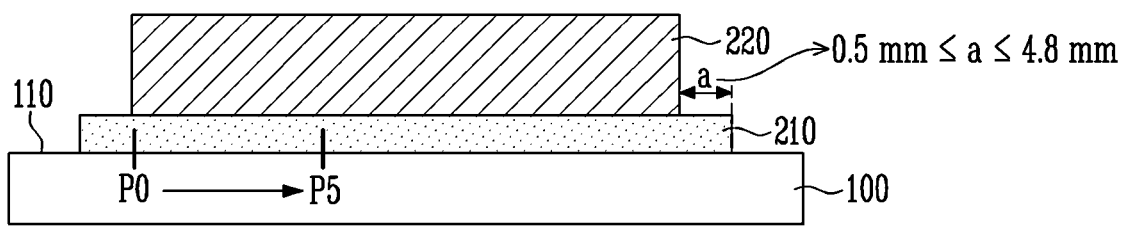
FIG. 1 is a diagram for explaining the structure of an anode according to one embodiment of the present invention.

In an embodiment, a first layer 210 may be in contact with one cross-section of an anode current collector 100 in a thickness direction. FIG. 1 illustrates an embodiment in which a first layer 210 is in contact with one cross-section of an anode current collector 100 in a thickness direction, but in another embodiment, a first layer 210 may be formed on both cross-sections of an anode current collector 100 in a thickness direction.

A first layer 210 may further comprise a thickener. A thickener can enhance the cohesiveness of a binder to improve the problem of generating cracks on a surface of an anode. A thickener may comprise at least one selected from the group consisting of carboxymethyl cellulose, methyl cellulose, hydroxypropyl cellulose, methyl hydroxypropyl cellulose, ethyl hydroxyethyl cellulose, methyl ethyl hydroxyethyl cellulose, and cellulose gum.

A second layer 220 may comprise an anode active material. An anode active material may comprise at least one material selected from the group consisting of a silicon-based material and a carbon-based material.

A silicon-based material may comprise, for example, at least one selected from the group consisting of $SiO_x$ ($0 \leq x < 2$), a Si/C composite, and a Si alloy. Here, x corresponds to the number ratio of O to Si included in $SiO_x$ ($0 \leq x < 2$). An average particle diameter ($D_{50}$) of $SiO_x$ ($0 \leq x < 2$) may be 4 μm to 9 μm, or 5 μm to 7 μm. When the range described above is satisfied, a decrease of the lifespan of secondary battery due to volume expansion of a silicon-based material may be prevented and side reactions on a surface of a silicon-based material may be suppressed. The specific surface area of $SiO_x$ ($0 \leq x < 2$) may be 4 m$^2$/g to 9 m$^2$/g, or 5 m$^2$/g to 8 m$^2$/g. When the range described above is satisfied, a conductive network with a conductive material may be improved. A Si/C composite may be subject to firing in a state where carbon is bonded to $SiO_x$ ($0 \leq x < 2$) particles so that a carbon material may be coated on $SiO_x$ ($0 \leq x < 2$) particles or carbon is dispersed in an atomic state inside $SiO_x$ ($0 \leq x < 2$) particles. A Si alloy may be a form in which Si is alloyed with at least one metal selected from the group consisting of Zn, Al, Mn, Ti, Fe, and Sn.

A carbon-based material may comprise, for example, at least one selected from the group consisting of artificial graphite, natural graphite, hard carbon, soft carbon, carbon black, acetylene black, Ketjen black, super P, and graphene.

In an embodiment, a second layer 220 may not comprise a binder or may comprise a binder in a smaller amount than a first layer 210.

In one embodiment, the content of a binder included in the entire anode may be 5.0% by weight or less based on the total weight of all solids of a first layer 210 and a second layer 220, or 4.0% by weight or less in another embodiment, 2.0% by weight or less in another embodiment, or 1.0% by weight or less in another embodiment. In addition, the content of a binder may be 0.05% by weight or more based on the total weight of all solids of a first layer 210 and a second layer 220, or 0.1% by weight or more in another embodiment. When the content of a binder satisfies the range described above, the adhesion with an anode current collector may be improved, while maintaining rapid charging performance.

In an embodiment, a first layer 210 or a second layer 220 may further comprise a conductive material to improve conductivity. A conductive material may be at least one selected from the group consisting of natural graphite, artificial graphite, carbon black, acetylene black, Ketjen black, channel black, furnace black, lamp black, summer black, carbon fiber, metal fiber, carbon fluoride, aluminum powder, nickel powder, zinc oxide, potassium titanate, titanium oxide, and polyphenylene derivatives.

In an embodiment, a first layer 210 or a second layer 220 may further comprise carbon nanotubes. Carbon nanotubes may form a conductive network between silicon-based materials, thereby minimizing the problem that a conductive path is isolated due to the volume expansion of silicon-based materials caused by long-term use of a secondary battery. Carbon nanotubes may comprise single-walled carbon nanotubes and multi-walled carbon nanotubes. Since single-walled carbon nanotubes can more effectively form a conductive network between silicon-based materials due to their high flexibility, the energy capacity retention rate of a secondary battery can be improved.

The average diameter of single-walled carbon nanotubes may be 0.1 nm to 8.0 nm, 1.5 nm to 5.0 nm, or 1.5 nm to 3.0 nm. When the range described above is satisfied, the average diameter is a value obtained by measuring the diameters of 100 single-walled carbon nanotubes in an anode active material layer through SEM and then calculating an average thereof. The average length of single-walled carbon nanotubes may be 3 μm to 20 μm, 4 μm to 20 μm, or 5 μm to 20 μm. When the range described above is satisfied, a conductive network connecting silicon-based materials may be maintained despite an excessive volume change of silicon-based materials, and thus the energy capacity retention rate of a secondary battery can be further improved. The average length is a value obtained by measuring lengths of 100 single-walled carbon nanotubes in an anode active material layer through SEM and then calculating an average thereof.

A multi-walled carbon nanotube refers to a carbon nanotube having a plurality of single-walled carbon nanotubes. Multi-walled carbon nanotubes are more economical than single-walled carbon nanotubes, and may contribute to the formation of a conductive network with adjacent silicon-based materials when disposed on a surface of a silicon-based material together with single-walled carbon nanotubes. The average diameter of multi-walled carbon nanotubes may be 5 nm to 200 nm, 5 nm to 100 nm, or 5 nm to 50 nm. When the range described above is satisfied, multi-walled carbon nanotubes may be easily dispersed in an anode active material composition and can effectively form a conductive network between silicon-based materials. The average diameter is a value obtained by measuring the diameters of 100 multi-walled carbon nanotubes in an anode mixture layer through SEM and then calculating an average thereof. The average length of multi-walled carbon nanotubes may be 0.1 μm to 100 μm, 0.1 μm to 50 μm, or 0.1 μm to 3 μm. When the range described above is satisfied, the formation of a conductive network may be maximized even with a small content in an anode active material composition. The average length is a value obtained by measuring lengths of 100 multi-walled carbon nanotubes in an anode mixture layer through SEM and then calculating an average thereof.

Figure 2:
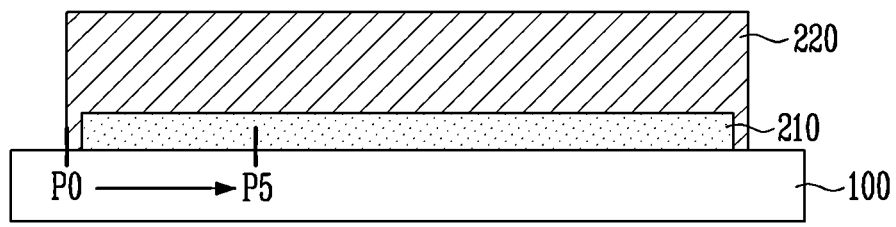
FIGS. 2 to 4 are diagrams for explaining the structure of an anode according to Comparative Examples of the present invention.

In an embodiment, an end portion of a first layer 210 in a width direction may protrude more than an end portion of a second layer 220 in a width direction. Here, an anode collector 100, a first layer 210, and a second layer 220 may be stacked in a thickness direction, and a width direction may refer to a direction that is perpendicular to a thickness direction. As shown in FIG. 2, when an end portion of a second layer 220 in a width direction protrudes more than an end portion of a first layer 210, due to the absence of a first layer 210 between an end portion of a second layer 220 and an anode current collector 100, a binder does not exist or the content of a binder is relatively low, and thus an anode active material may be extracted in a process such as pressing or notching in a secondary battery manufacturing process.

In one embodiment, a distance from an end portion of a first layer 210 in a width direction to an end portion of a second layer 220 in a width direction may be 0.5 mm to 5.0 mm. When a distance from an end portion in the width direction to an end portion in a width direction of a second layer 220 is 0.5 mm or more, the occurrence of drop formation at an end of a first layer 210 may be prevented. Accordingly, in a process of forming a first layer 210 and a second layer 220, the occurrence of a side ring phenomenon in which an end portion of a first layer 210 and/or a second layer 220 becomes thick may be prevented. Accordingly, the quality of an anode electrode 1000 may be improved. In addition, when a distance from an end portion in a width direction to an end portion in a width direction of a second layer 220 is 5.0 mm or less, the generation of welding defects may be prevented, and the energy density per volume of a secondary battery may be improved. In addition, more specifically, when a distance from an end portion in a width direction to an end portion in a width direction of a second layer 220 is excessively long, in a later process for welding taps, an area to which a first composition forming a first layer 210 is applied may be overlapped with a welding area to generate welding defects. On the contrary, when a welding area is adjusted to be longer, there may be the problem that the energy density per volume of a secondary battery may be reduced.

Accordingly, when a distance from an end portion of a first layer 210 in a width direction to an end portion of a second layer 220 in a width direction is within the ranged described above, the performance of a secondary battery may be improved and at the same time, extraction of an anode active material may be prevented.

In an embodiment, an anode current collector 100 may comprise, at an end portion in a width direction, an uncoated portion on which the first layer is not formed. An anode 1000 may further comprise an anode tab (not shown) extending from an uncoated portion 110.

In one embodiment, the thickness of a first layer 210 may be 0.3 μm to 1.0 μm. When the thickness of a first layer 210 is within the range described above, excellent performance of a secondary battery can be maintained by preventing an increase of resistance while securing sufficient adhesion to an anode current collector 100. Here, the thickness of a first layer 210 may be a thickness measured before a second layer 220 is formed. In other words, after applying a first composition to form a first layer 210 and applying a second composition to form a second layer 220, the thickness of a first layer only may be difficult to measure due to the mixing of a first composition and a second composition. Therefore, in the present Specification, the thickness of a first layer 210 may refer to the thickness measured before a second layer 220 is formed.

In an embodiment, a first layer 210 may be formed from a first composition comprising a binder, and a second layer 220 may be formed from a second composition comprising an anode active material. However, a binder included in a first composition may partially migrate to a second layer 220, and an anode active material included in a second composition may partially migrate to a first layer 210.

<Anode Manufacturing Method>

An anode manufacturing method according to the present disclosure comprises: applying a first composition comprising a first binder to one cross-section of an anode current collector in a thickness direction; and applying a second composition comprising an anode active material to the applied first composition, wherein the second composition may be applied such that an end portion in a width direction perpendicular to the thickness direction may be located more internally than the position where the first composition is applied.

First, an anode manufacturing method according to the present invention may comprise applying a first composition comprising a first binder to one cross-section of an anode current collector in a thickness direction.

The first composition may comprise a binder described above. A binder may improve the adhesion between an anode current collector and an anode active material, thereby improving the capacity retention rate of a secondary battery, and may comprise, for example, styrene butadiene rubber. In the present Specification, a binder included in a first composition may be referred to as a first binder.

A first composition may comprise 50% to 99.5% by weight of a first binder based on a solid content of a first composition. When the content of a first binder is 50% by weight or more, sufficient adhesive force may be secured at an interface between a first layer formed by a first composition and a second layer formed by a second composition. When the content of a first binder is 99.5% by weight or less, the viscosity of a first composition is appropriate so that a first composition may be applied in a uniform thickness, and a slip problem that occurs when a first composition is applied and then a second composition is applied thereon may be prevented.

In an embodiment, a first composition may further comprise a thickener described above to secure advantages in a manufacturing process.

A first composition may comprise a thickener in an amount of 0.5% to 5% by weight based on a solid content of a first composition. When the content of a thickener is 0.5% by weight or more, the viscosity of a first composition is appropriate so that a first composition may be applied in a uniform thickness, and a slip problem that occurs when a first composition is applied and then a second composition is applied thereon may be prevented. When the content of a thickener is 5% by weight or less, the generation of pinholes may be suppressed, and the problem that the thickness of end portions of a first layer and a second layer formed is increased due to the application of a first composition and a second composition may be prevented.

In addition, in an embodiment, a first composition may further comprise a conductive material described above to improve conductivity according to the need. However, in another embodiment, a conductive material may not be included in consideration of adhesion to an anode current collector.

In an embodiment, a first composition may be in a form in which a solvent is included, and a solvent may be, for example, water, but is not limited thereto.

A first composition may comprise 60% to 90% by weight of a solvent. When the content of a solvent is 60% by weight or more, a first layer may be coated in an appropriate thickness range. When the content of a solvent is 90% by weight or less, a wettability problem that occurs when a first composition and a second composition are applied may be prevented, and a slip problem that occurs when a first composition is applied and then a second composition is applied thereon may be prevented.

Next, an anode manufacturing method according to the present invention may comprise applying a second composition to the applied first composition.

A second composition may comprise an anode active material described above. An anode active material may be, for example, at least one material selected from the group consisting of a silicon-based material and a carbon-based material.

In one embodiment, a second composition may further comprise a binder described above. At this time, a second composition may comprise 2.0% by weight or less of a binder, 1.0% by weight or less in another embodiment, 0.8% by weight or less in another embodiment, or 0.6% by weight or less in another embodiment. In addition, in another embodiment, a second composition may not comprise a binder. In other words, when a second composition comprises a binder within a range described or comprises no binder, the resistance of a secondary battery may be drastically lowered, and lithium salt precipitation may be prevented during rapid charging to secure long lifespan properties. In the present Specification, a binder included in a second composition may be referred to as a second binder. In one embodiment, a first binder and a second binder may be the same material. In another embodiment, a first binder and a second binder may be made of different materials.

In one embodiment, the total content of a first binder and a second binder included in the entirety of a first composition and a second composition may be 5.0% by weight or less based on the total weight of all solids of a first composition and a second composition, 4.0% by weight or less in another embodiment, 2.0% by weight or less in another embodiment, or 1.0% by weight or less in another embodiment. In addition, the total content of a first binder and a second binder may be 0.05% by weight or more based on the total weight of all solids of a first composition and a second composition or 0.1% by weight or more in another embodiment. When the content of a binder satisfies a range described above, adhesion with an anode current collector may be improved while maintaining rapid charging performance.

A second composition may be applied to be located 0.5 mm to 5.0 mm inside in a width direction compared to the position where a first composition is applied. When a second composition is applied to be located 0.5 mm or more inside in a width direction, compared to the position where a first composition is applied, the occurrence of drop formation at an end of an anode mixture layer, formed by a first composition and a second composition, may be prevented, and accordingly, the occurrence of a side ring phenomenon in which an end portion of an anode mixture layer becomes thick in an anode mixture layer formation process may be prevented. Accordingly, the quality of an anode 1000 may be improved. In addition, when a second composition is applied within a distance of 5.0 mm or less in a width direction compared to the position where a first composition is applied, the generation of welding defects may be prevented, and the energy density per volume of a secondary battery may be improved. More specifically, when a second composition is applied excessively far away from the position where a first composition is applied, in a later process for welding taps, an area to which a first composition is applied may be overlapped with a welding area to generate welding defects. On the contrary, when a welding area is adjusted to be longer, there may be the problem that the energy density per volume of a secondary battery may be reduced.

Accordingly, when a second composition is applied within a range described above in a width direction compared to the position where a first composition is applied, the performance of a secondary battery may be improved and at the same time, extraction of an anode active material may be prevented.

In an embodiment, a second composition may further comprise a conductive material described above to improve conductivity. In addition, in an embodiment, a second composition may further comprise a thickener to secure advantages in the manufacturing process.

In an embodiment, a second composition may be in a form in which an anode active material described above is included in a solvent, and the solvent may be, for example, water, but is not limited thereto.

A first layer described above may be formed of a first composition, and a second layer described above may be formed of a second composition. In an embodiment, a second layer and a second layer may be formed by applying a first composition on an anode current collector and then applying a second composition without drying the first composition, and then drying the first composition and the second composition. Application of a first composition and a second composition may be performed in a wet-on-wet manner by, for example, a slot-die coater, a roll-coater, a knife coater, an extrusion coater, a gravure-coater or the like.

Due to the migration of each ingredient, an ingredient of a second composition may partially be included in a first layer, and an ingredient of a first composition may partially be included in a second layer.

<Secondary Battery>

A secondary battery according to the present invention comprises an anode, a cathode, and a separator interposed between an anode and a cathode described above.

A secondary battery comprises an anode 1000, and anode 1000 may use the same anode current collector 100, first layer 210, second layer 220, and the like described above in relation to an anode 1000.

A secondary battery may comprise a cathode and a separator in addition to an anode of the present invention. A cathode may comprise a cathode current collector and an active material layer disposed on a cathode current collector. An active material layer may comprise an active material. For example, a cathode active material layer may comprise a cathode active material, and a cathode active material may be a material which lithium ions may be inserted to and extracted from.

A cathode active material may be a lithium metal oxide. For example, a cathode active material may be one of lithium manganese oxide, lithium nickel oxide, lithium cobalt oxide, lithium nickel manganese oxide, lithium nickel cobalt aluminum oxide, lithium iron phosphate compound, lithium manganese phosphate compound, lithium cobalt phosphate compound, and a lithium vanadium phosphate compound, and is not necessarily limited to a specific example.

A separator may be interposed between an anode and a cathode. A separator is configured to prevent an electrical short circuit between an anode and a cathode and to generate an ion flow. A separator may comprise a porous polymer film or a porous non-woven fabric. Here, a porous polymer film is configured as a single layer or a multi-layer comprising a polyolefin-based polymer such as an ethylene polymer, a propylene polymer, an ethylene/butene copolymer, an ethylene/hexene copolymer, and an ethylene/methacrylate copolymer. A porous nonwoven fabric may comprise a glass fiber of a high melting point and a polyethylene terephthalate fiber. However, it is not limited thereto, and according to embodiments, a separator may be a ceramic coated separator (CCS) comprising ceramic.

An anode, a cathode, and a separator may be manufactured into an electrode assembly by a winding, lamination, folding, or zigzag stacking process. In addition, an electrode assembly may be provided together with an electrolyte solution to manufacture a secondary battery according to the present invention. A secondary battery may be any one of a cylindrical shape using a can, a prismatic shape, a pouch shape, and a coin shape, but is not limited thereto.

An electrolyte may be a non-aqueous electrolyte. An electrolyte may comprise a lithium salt and an organic solvent. The organic solvent may comprise at least one of propylene carbonate (PC), ethylene carbonate (EC), diethyl carbonate (DEC), dimethyl carbonate (DMC), ethylmethyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gamma-butyrolactone, propylene sulfide, or tetrahydrofuran.

Hereinafter, the present invention will be described in more detail based on Examples and Comparative Examples. However, the following Examples and Comparative Examples are merely examples for explaining the present invention in more detail, and the present invention is not limited by the following Examples and Comparative Examples.

MANUFACTURING EXAMPLE

Manufacturing of First Composition

A CMC solution was prepared by dissolving CMC (carboxymethyl cellulose, Daicel 2200), which is a thickener, in pure water to have a solid content of 0.6% by weight. A first composition was prepared by mixing the CMC solution prepared above with a binder, SBR (styrene butadiene rubber, Zeon BM451B) suspension (water used as a solvent). At this time, mixing was performed such that the content of SBR was 99% by weight and the content of CMC was 1% by weight based on the solids of a first composition.

Manufacturing of Second Composition

A second composition having a viscosity of 5,000 cps was prepared by adding an anode active material in which artificial graphite and natural graphite were mixed in a weight ratio of 7:3, a CMC thickener, and an SBR binder to water in a weight ratio of 98.4:1:0.6.

Example 1

After applying the prepared first composition of Manufacturing Example to a copper thin film, a second composition was applied on the first composition. The second composition was applied to be located 2.0 mm inside in a width direction compared to the position where the first composition was applied.

Here, the thickness of a first composition may be measured in a state where a second composition is not applied. The first composition was applied so that the thickness of the first layer after drying was less than 1 μm, and the second composition was applied the thickness of the second layer after drying was about 225 μm. The structure before drying in which the first composition and the second composition were applied may be understood through FIG. 1.

After that, an anode having a first layer and a second layer was manufactured by passing through a hot air drying furnace that was properly controlled in a temperature range of 80° C. to 200° C.

Example 2

An anode was manufactured in the same manner as in Example 1, but a second composition was applied to be located 3.0 mm inside in a width direction compared to the position where a first composition was applied. The structure before drying in which the first composition and the second composition were applied may be understood through FIG. 1.

Example 3

An anode was manufactured in the same manner as in Example 1, but a first composition was prepared such that the content of SBR was 56% by weight, the content of CMC was 4% by weight, and the content of a conductive material (Imerys Super-C65) was 40% by weight based on the solids of the first composition.

Example 4

An anode was manufactured in the same manner as in Example 1, but a second composition having a viscosity of 5,000 cps was prepared by adding to water an anode active material in which artificial graphite and natural graphite were mixed at a weight ratio of 7:3, an silicon oxide ($SiO_x$) anode active material, a CMC thickener, and an SBR binder at a weight ratio of 96.4:2:1:0.6 based on the solids of the second composition.

Comparative Example 1

An anode was prepared in the same manner as in Example 1, but a second composition was applied to be located 2.0 mm outside in a width direction compared to the position where a first composition was applied. The structure before drying in which the first composition and the second composition were applied may be understood through FIG. 2.

Comparative Example 2

Figure 3:
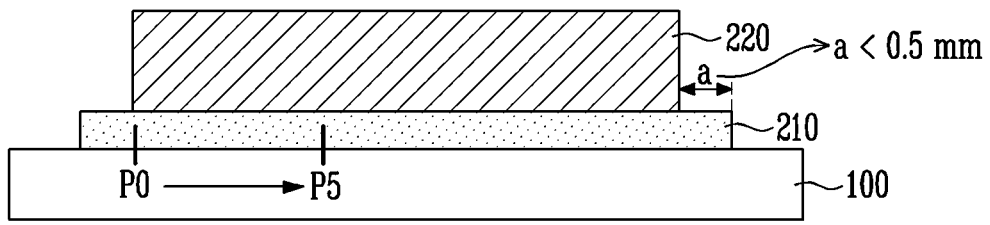

An anode was prepared in the same manner as in Example 1, but a second composition was applied to be located 0.3 mm inside in a width direction compared to the position where a first composition was applied. The structure before drying in which the first composition and the second composition were applied may be understood through FIG. 3.

Comparative Example 3

Figure 4:
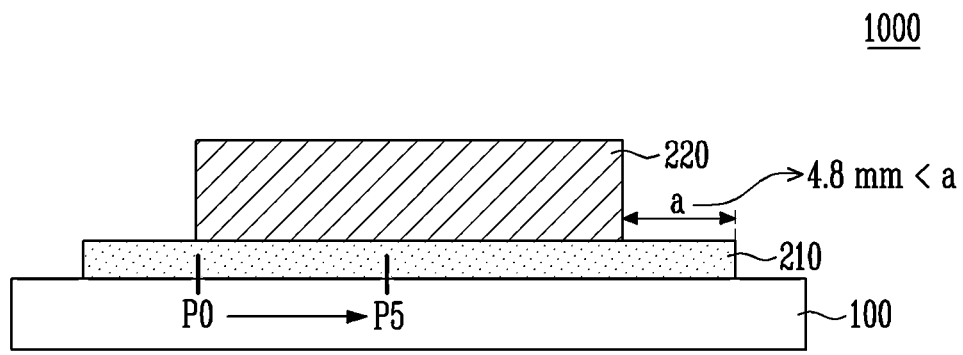

An anode was prepared in the same manner as in Example 1, but a second composition was applied to be located 5.2 mm inside in a width direction compared to the position where a first composition was applied. The structure before drying in which the first composition and the second composition were applied may be understood through FIG. 4.

<Experimental Example 1> Anode Thickness Profile Analysis

To analyze the thickness profile of the anodes of Examples 1 and 2 and Comparative Examples 1 to 3, the thickness according to the distance from an end portion of each anode in a width direction was measured and is shown in Table 1 below.

TABLE 1

| Position | Thickness (mm) = t(Pk) | | | | |
|---|---|---|---|---|---|
| | Example 1 | Example 2 | Comparative Example 1 | Comparative Example 2 | Comparative Example 3 |
| P0 | 208 | 204 | 202 | 208 | 203 |
| P1 | 218 | 214 | 206 | 228 | 217 |
| P2 | 220 | 217 | 214 | 213 | 215 |
| P3 | 223 | 219 | 212 | 218 | 219 |
| P4 | 226 | 221 | 216 | 220 | 224 |
| P5 | 224 | 220 | 221 | 221 | 226 |

In Table 1, P0 refers to an end portion of an area where a second layer was formed, and positions shifted by 1 mm each in a width direction based on P0 were defined as P1 to P5.

Accordingly, the degree of occurrence of a side ring phenomenon was calculated through Equation 1 below and is shown in Table 2 below.

Side ring = Max($t(P0)$, $t(P1)$, $t(P2)$) − Avg($t(P3)$, $t(P4)$, $t(P5)$)   ⟨Equation 1⟩

(Here, $t(Pk)$ is the thickness at the $Pk$ position.)

TABLE 2

| | Example 1 | Example 2 | Comparative Example 1 | Comparative Example 2 | Comparative Example 3 |
|---|---|---|---|---|---|
| Side ring (mm) | −4 | −3 | −2 | 8 | −6 |

Figure 5:
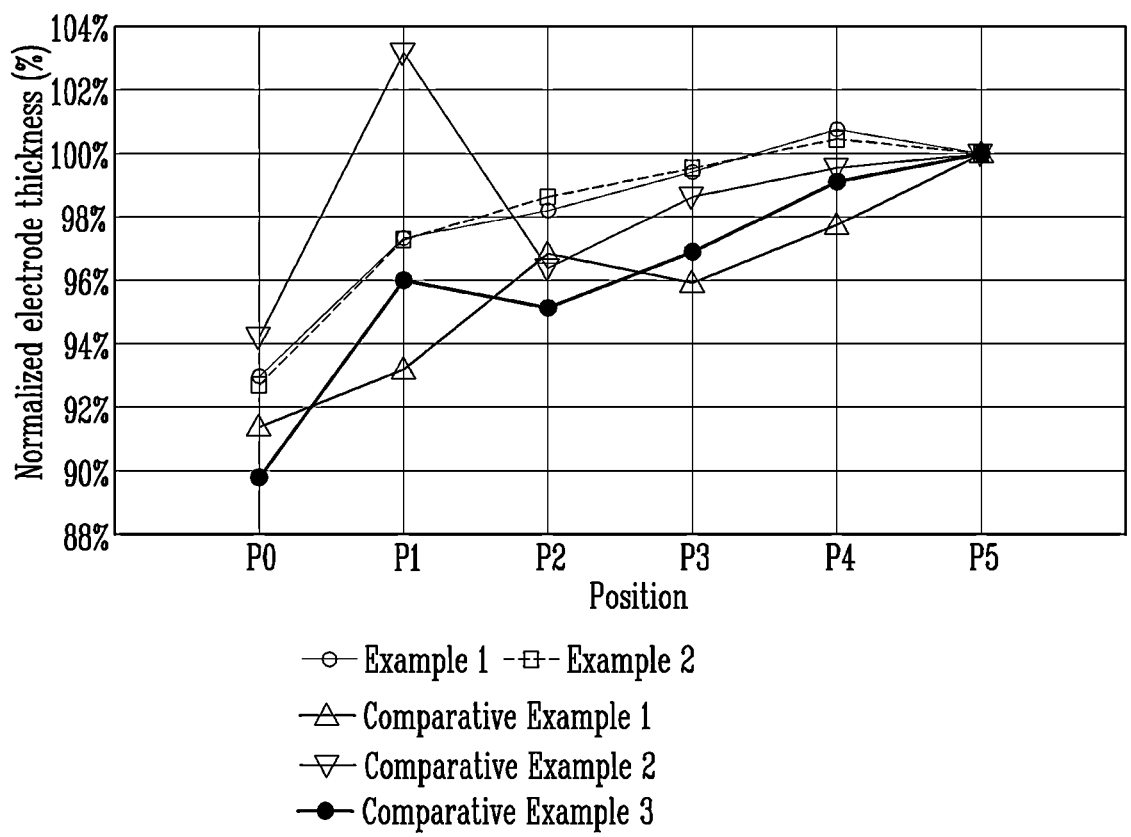
FIG. 5 is a graph showing the thickness profiles of anodes according to embodiments and comparative examples of the present invention.

In addition, the thickness profile when the thickness of P5 was 100% is shown in FIG. 5.

As shown in Tables 1, 2 and 5, it was confirmed that a side ring phenomenon, in which the thickness on an end portion side in a width direction becomes relatively thick, occurred when a second composition was applied to be located inside by a distance of less than 0.5 mm in a width direction compared to the position where a first composition was applied as in Comparative Example 2.

More specifically, in Comparative Example 2, the thickness at P1 was 228 mm (see Table 1), and the degree of occurrence of a side ring phenomenon is calculated to be 8 mm (see Table 2).

In addition, even when FIG. 5 is checked, in Comparative Example 2, it may be confirmed that the thickness at a position close to an end portion was very thick as 103% compared to an internal position in a width direction.

Figure 6:
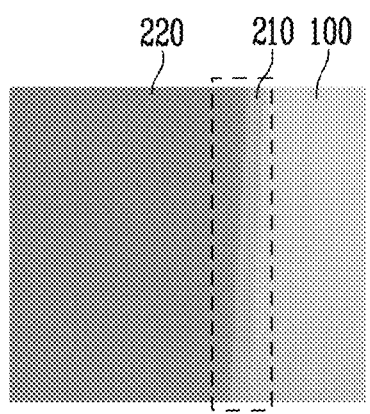
FIG. 6 is an image showing an anode according to one embodiment of the present invention.
Figure 8:
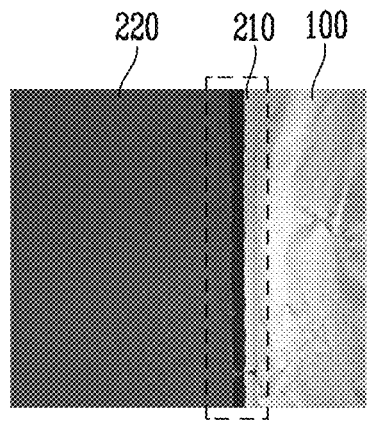
FIG. 8 is an image showing an anode according to another comparative example of the present invention.

In addition, FIG. 6 shows an image of an anode of Example 1, and FIG. 8 shows an image of an anode of Comparative Example 2.

At an end portion in a width direction to which a first composition is applied, drop formation may occur depending on the surface tension, and due to the drop formation, a thick area may be narrowly formed at the end portion in a width direction of an area to which the first composition is applied. When the area at the end portion of the first composition in a width direction meets with an area to which a second composition is applied, the first composition is rapidly diffused to an end portion of the area to which the second composition is applied.

In other words, in the case of Comparative Example 2 where an end portion in a width direction of an area to which a first composition is applied is relatively close to an end portion in a width direction of an area to which a second composition is applied, a side ring phenomenon occurs. Therefore, as a first composition is diffused to an end portion of an area where a second composition is applied, the color of an end portion in a width direction of a second layer 220 formed by a second composition as in FIG. 8 is different from FIG. 6 representing an anode of Example 1.

Figure 7:
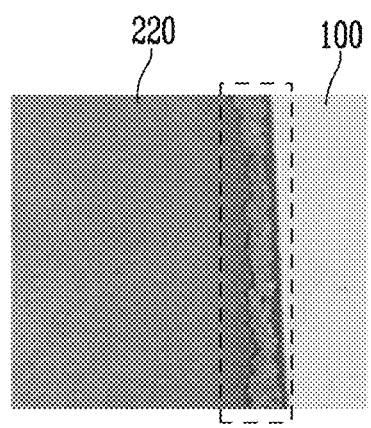
FIG. 7 is an image showing an anode according to one comparative example of the present invention.

<Experimental Example 2> Observation of Occurrence of Desorption of Anode Active Material To confirm the occurrence of extraction of an anode active material included in a second composition with respect to the anodes of Examples 1 to 4 and Comparative Examples 1 to 3, a tape peeling test was performed with the anodes (a surface on an end portion side of a second layer 220) of Examples 1 to 4 and Comparative Examples 1 to 3, and the results are shown in Table 3 and FIGS. 6 and 7 below.

A tape peel test was performed by cutting a 3M single-sided tape with a width of 18 mm into a length of 100 mm, attaching the tape so that an end portion of an anode and a 70 mm position of the tape coincided, and then separating the tape so that the angle between the electrode and the tape became 180° while gripping the remaining 30 mm length. The tape was separated such that the separation speed was 20 mm of the tape length per second.

TABLE 3

| | Example 1 | Example 2 | Example 3 | Example 4 | Comparative Example 1 | Comparative Example 2 | Comparative Example 3 |
|---|---|---|---|---|---|---|---|
| Occurrence of anode active material extraction | X | X | X | X | ○ (2 mm) | X | X |

○ indicates that the anode active material extraction occurred, and X indicates that the anode active material extraction did not occur.

According to Table 3 above, when a second composition was applied to be located outside in a width direction compared to the position where a first composition was applied as in Comparative Example 1, after removing the tape, an anode active material was extracted along a length direction in an area located outside compared to an area formed by applying the first composition in an area formed by applying the second composition.

In addition, through comparison of FIGS. 6 and 7, it can be visually confirmed that an anode active material was extracted after the separation of the tape in Comparative Example 1.

FIG. 6, representing an anode of Example 1, confirms that no extraction of an anode active material occurred at an end portion in a width direction after the tape was removed.

On the contrary, FIG. 7 shows an anode of Comparative Example 1, and FIG. 7 confirms that an anode active material was extracted from an end portion in a width direction after the tape was removed.

In addition, in the case of Example 3, since a first layer comprised a conductive material, there was no extraction due to the effect of a binder adsorbed on a surface of the conductive material, but it was confirmed that the adhesive force was slightly lower than that of Example 1.

Experimental Example 3: Results of Manufacturing Secondary Battery

Manufacturing of Cathode

A slurry was prepared by mixing Li[$Ni_{0.88}Co_{0.10}Mn_{0.02}$]$O_2$, carbon black, and polyvinylidene fluoride (PVdF) as active materials at a weight ratio of 96:3:1. The slurry was uniformly applied to an aluminum foil and dried with hot air to prepare a cathode.

<Manufacturing of Secondary Battery>

The anodes of Examples 1 to 4 and Comparative Examples 1 to 3 and the cathode described above were subjected to a pressing process so that the compression ratio was about 30%, and then an anode, a cathode, and a PE separator, which were cut to a certain sizes, were laminated. After laminating 41 sheets of anode and 40 sheets of cathode, uncoated portions of an anode and a cathode were welded to each other, and an anode tab and a cathode tab were each welded to overlap a welded portion. The position of the welded portion on an anode was determined such that welding could start at a position 5 mm in a width direction from an end portion to which a second composition was applied.

The results of performing the secondary battery manufacturing process are shown in Table 4 below.

On the contrary, in Comparative Example 1, a problem of extracting an anode active material occurred during the pressing process.

In addition, in Comparative Example 2, as a side ring phenomenon occurred, the side density was locally increased, and thus a surface of the roll for performing a pressing process was contaminated, resulting in a decrease of processability.

In addition, in Comparative Example 3, in a primary welding process between uncoated portions of an anode and in a process of welding an anode tap and an uncoated portion, an area to which a first composition was applied and an area to be welded overlapped, and thus interference occurred during welding. Consequently, a device was contaminated as a binder was melted during welding or separation between uncoated portions or between an uncoated portion and a tap occurred after welding because the strength of some welded portions was not uniform.

With regard to Comparative Example 3, adjusting the position of a welding portion may be taken into consideration to prevent the occurrence of interference during welding, but in such a case, the energy density per volume of a secondary battery may be reduced.

What is claimed is:

1. An electrode assembly for secondary battery comprising an anode and a cathode, wherein the anode comprises:
   an anode current collector;
   a first layer comprising a binder and contacting at least one surface of the anode current collector in a thickness direction;
   a second layer comprising an anode active material and contacting one surface of the first layer in a thickness direction, and
   an end portion of the first layer in a width direction perpendicular to the thickness direction protrudes beyond an end portion of the second layer in the width direction,
   wherein the anode and the cathode are manufactured into the electrode assembly by a lamination, folding, or zigzag stacking process, and
   wherein a distance from the end portion of the first layer in the width direction to the end portion of the second layer in the width direction is 0.5 mm to 5.0 mm.

2. The electrode assembly for secondary battery according to claim 1, wherein the binder comprises a styrene butadiene rubber (SBR)-based binder.

3. The electrode assembly for secondary battery according to claim 1, wherein the binder is included in 5.0% by weight or less based on the total weight of all solids of the first layer and the second layer.

TABLE 4

|  | Example 1 | Example 2 | Example 3 | Example 4 | Comparative Example 1 | Comparative Example 2 | Comparative Example 3 |
|---|---|---|---|---|---|---|---|
| Results of performing secondary battery manufacturing process | Normal | Normal | Normal | Normal | Extraction of an anode active material occurred in the pressing process. | Contamination of the press roll occurred. | An interference occurred during welding. |

In Examples 1 to 4, the process after the formation of a first layer and a second layer could be normally performed.

4. The electrode assembly for secondary battery according to claim 1, wherein the anode active material comprises at least one material selected from the group consisting of a silicon-based material and a carbon-based material.

5. The electrode assembly for secondary battery according to claim 4, wherein the silicon-based material comprises at least one selected from the group consisting of $SiO_x$ ($0 \leq x < 2$), a Si/C composite, and a Si alloy.

6. The electrode assembly for secondary battery according to claim 4, wherein the carbon-based material comprises at least one selected from the group consisting of artificial graphite, natural graphite, hard carbon, soft carbon, carbon black, acetylene black, Ketjen black, super P, and graphene.

7. The electrode assembly for secondary battery according to claim 1, wherein a thickness of the first layer is 0.3 μm to 1.0 μm.

8. The electrode assembly for secondary battery according to claim 1, wherein the anode current collector comprises, at an end portion in the width direction, an uncoated portion on which the first layer is not formed.

9. The electrode assembly for secondary battery according to claim 1, further comprising an anode tab extending from the uncoated portion.

10. A method of manufacturing the electrode assembly according to claim 1, the method comprising the steps of:
applying a first composition comprising a first binder to one surface of an anode current collector in a thickness direction; and
applying a second composition comprising an anode active material to the applied first composition,
wherein an end portion of the applied first layer in a width direction perpendicular to the thickness direction protrudes beyond an end portion of the applied second layer in the width direction.

11. The method according to claim 10, wherein a distance from the end portion of the applied first composition in the width direction to the end portion of the applied second composition in the width direction is 0.5 mm to 5.0 mm.

12. The method according to claim 10, wherein the first composition is applied in a thickness of 0.3 μm to 1.0 μm.

13. The method according to claim 10, wherein the first binder is included in an amount of 50% to 99.5% by weight based on a solid content of the first composition.

14. The method according to claim 10, wherein the second composition further comprises a second binder.

15. The method according to claim 14, wherein the second binder is included in an amount of 2.0% by weight or less based on a solid content of the second composition.

16. The method according to claim 10, wherein the first composition further comprises a thickener.

17. The method according to claim 16, wherein the thickener comprises at least one selected from the group consisting of carboxymethyl cellulose, methyl cellulose, hydroxypropyl cellulose, methyl hydroxypropyl cellulose, ethyl hydroxyethyl cellulose, methyl ethyl hydroxyethyl cellulose, and cellulose gum.

18. The method according to claim 16, wherein the thickener is included in an amount of 0.5% to 5% by weight based on a solid content of the first composition.

19. The method according to claim 10, further comprising drying the first composition and the second composition, after applying the second composition.

* * * * *